Feb. 2, 1960 S. G. BEST 2,923,361
HYDROMECHANICAL PROPELLER CONTROL
Filed May 17, 1955 3 Sheets-Sheet 1

INVENTOR
STANLEY G. BEST
BY *Leonard F. Weklund*
ATTORNEY

Feb. 2, 1960

S. G. BEST 2,923,361

HYDROMECHANICAL PROPELLER CONTROL

Filed May 17, 1955

INVENTOR
STANLEY G. BEST
BY
ATTORNEY

United States Patent Office 2,923,361
Patented Feb. 2, 1960

2,923,361

HYDROMECHANICAL PROPELLER CONTROL

Stanley G. Best, Manchester, Conn., assignor to United Aircraft Corporation, East Hartford, Conn., a corporation of Delaware Application May 17, 1955, Serial No. 508,868

17 Claims. (Cl. 170—135.29)

This invention relates to propellers and more particularly to controls for regulating the pitch of the propeller blades.

It is an object of this invention to provide a propeller control for propellers driven by turbine or other similar power plants.

It is another object of this invention to provide a temporary droop governing system having a speed setting system including a time delay mechanism and a blade angle feedback mechanism operating through said time delay mechanism.

A further object of this invention is to provide a control having an anticipative action to adjust the speed setting for sudden power increases of the power plant. This type of control action provides for rapid absorption of the power increase and avoids excessive speed hunting.

Another object of this invention is to provide a hydraulic bias on the main governor pilot valve to modify the propeller speed setting in conjunction with a propeller synchronizer in multi-engine installations.

These and other objects will become readily apparent from the following detailed description of the drawings in which.

Figure 1:
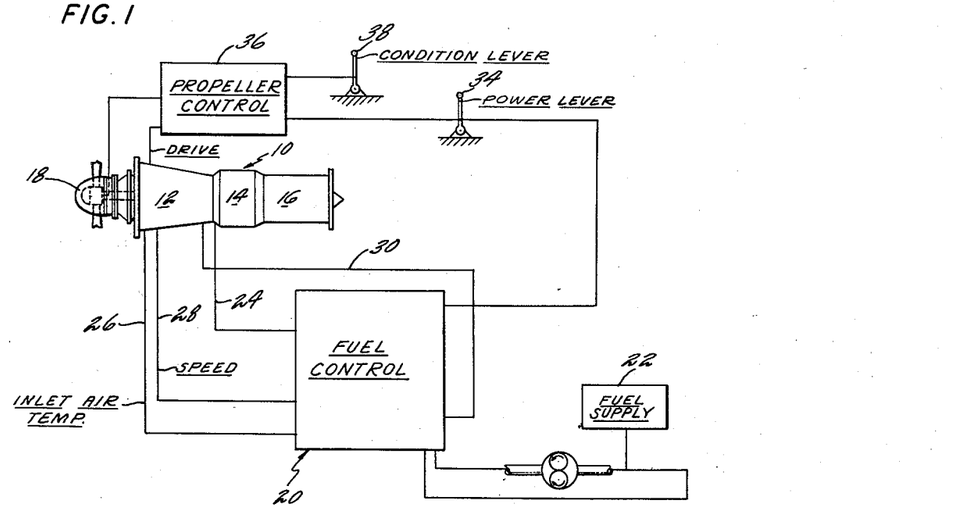
Fig. 1 is a schematic illustration of a turboprop power plant having a fuel control coordinated with a propeller control according to this invention.

Referring to Fig. 1 a turbine type power plant 10 is illustrated. The power plant includes a compressor section 12, a burner section 14 and a turbine and exhaust section 16. The power plant may be of any type such that one of the turbine stages drives a variable pitch propeller 18. The propeller may be of the type shown and described in the Forman Patent No. 2,477,868. A fuel control 20 is provided for controlling the flow of fluid from the supply tank 22 and thence via a line 24 to the combustion section 14. The fuel control may be of any desired type but the one illustrated herewith senses inlet air temperature via the line 26, speed via the connection 28 and compressor discharge pressure via the line 30. A control sensing these parameters is fully disclosed in patent application Serial Number 244,551 by Stanley G. Best, filed August 31, 1951, now U.S. Patent No. 2,822,666. The fuel control 20 is controlled by a power lever 34. The power lever 34 is also connected to the propeller control 36. The propeller control 36 is set by the power lever 34 and also by a condition lever 38. The functions of the power lever 34 and the condition lever 38 are described in more detail hereinafter in connection with Fig. 2.

Figure 2:
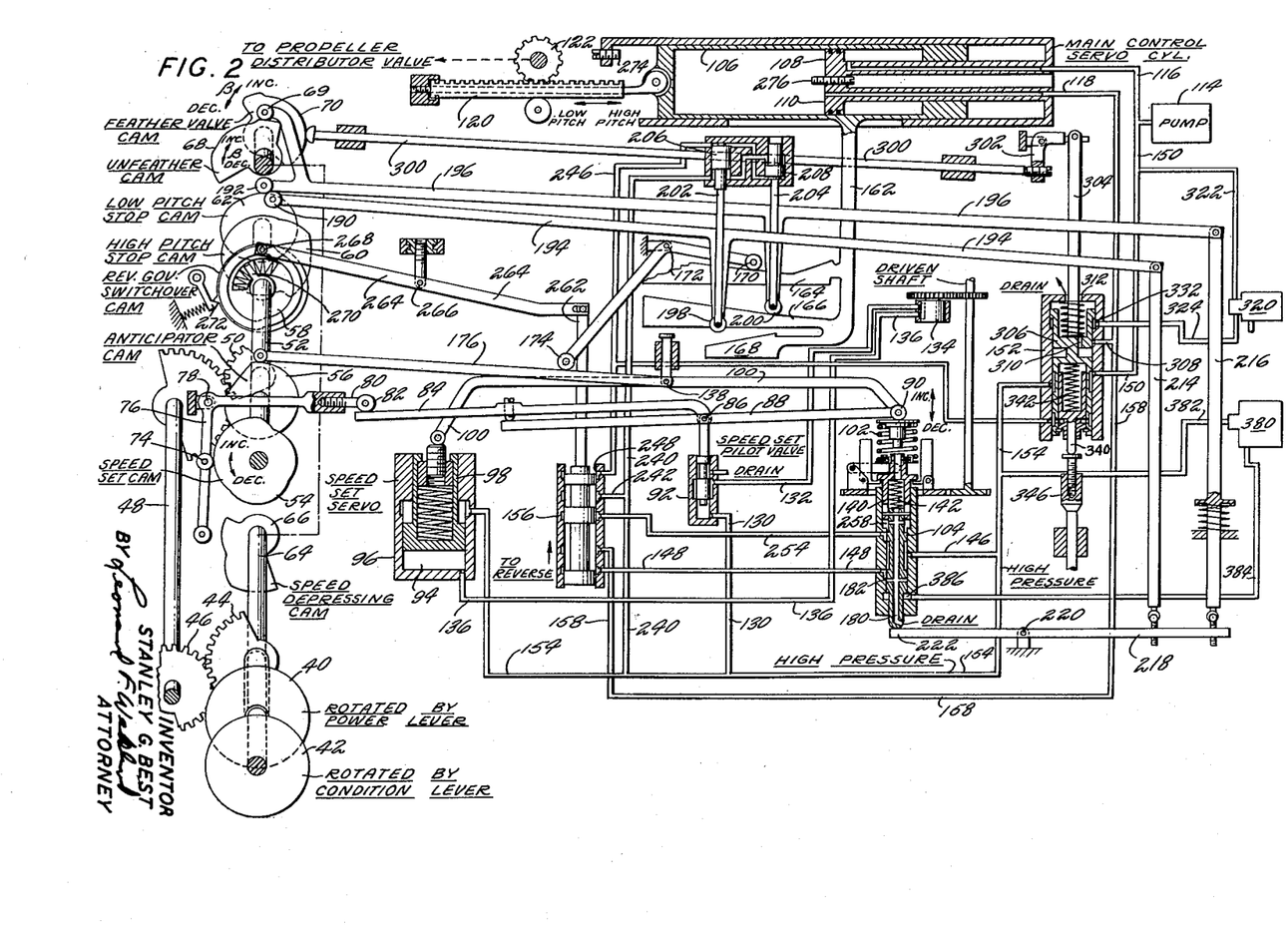
Fig. 2 is a schematic illustration of the propeller control of this invention.

The propeller control 36 is more clearly illustrated in the schematic system shown in Fig. 2. Inasmuch as the control has a number of operative functions, only portions of the system will be described at a time for reasons of clarity. However, a brief overall identification of the major elements will be presented. First of all, the power lever 34 of Fig. 1 rotates the pulley 40 while the condition lever 38 of Fig. 1 rotates the pulley 42. The pulley 40 operated by the power lever 34 in turn rotates the gear segments 44 and 46, shaft 48 and finally the gear segment 50 of the shaft 52. The shaft 52 is intended to control a speed setting cam 54 and anticipator cam 56, a reverse governing switchover cam 58, a high pitch stop cam 60 and a low pitch stop cam 62. The pulley 42, on the other hand, responds to movement of the condition lever 38 and rotates a second shaft 64 which in turn rotates a speed depressing cam 66 and unfeathering cam 68 and a feathering cam 70. The function of each of the cams will be described in connection with the particular mechanism which they are intended to actuate.

First of all, the speed setting system comprises primarily the speed setting cam 54 which moves the cam follower 74 carried by a bell crank 76 which is pivoted at 78 and has one arm 80 carrying a roller 82 which engages a rod 84 connected at 86 to another rod 88 which carries a movable roller 90 at its extreme right end. Motion of the speed setting cam 54 will transmit motion to the rod 84 to the connection 86 which, in turn, will move the speed setting pilot valve 92 so as to control the flow of fluid to the chamber 94 of the speed setting servo 96. The speed setting servo 96 includes a piston 98 which engages a link rod 100. The rod 100 at its right-hand end is connected to the roller 90, hence the speed setting servo piston 98 positions the roller 90 so as to change the compression on the speeder spring 102 of the control valve 104. The control valve 104 then in turn controls the flow of high pressure fluid to the main control servo cylinder 106 shown at the top of the drawing.

It will be noted that the servo cylinder 106 comprises a stationary piston 108 which has its left-hand area 110 larger than the right-hand area 112. The right side 112 of the piston is continually exposed to high pressure fluid from a pump 114 adjacent thereto via a line 116. The left-hand side 110 of the piston 108 is supplied with either high pressure or drain pressure via the line 118. With high pressure supplied to the side 110, the over-balancing force will tend to move the cylinder 106 to the left and when low pressure fluid is supplied to the side 110 the cylinder 106 will move toward the right. The motion of the cylinder 106 is transmitted to a rack 120 and a pinion 122 which, in turn, may be operatively connected to the propeller control or distributor valve such as that shown in Patent Number 2,664,960, issued to Longfellow et al.

For reasons of clarity it is best to describe a complete cycle of increasing r.p.m. and a cycle of the decreasing r.p.m. to define the function of each of the elements in the primary speed setting system. In order to increase the r.p.m. setting, the power lever rotates the speed setting cam 54 in a clockwise direction. As the cam 54 rotates clockwise the cam follower 74 moves to the right, thereby raising the arm 80 and the roller 82 and permitting the rod 84 and its connecting point 86 to move upward. This upward motion results from the fact that the speed setting pilot valve 92 has its bottom land continuously exposed to high pressure fluid of the line 130. The path of this high pressure fluid will be described hereinafter in connection with the movement of the governor control valve 104. As the speed setting pilot valve 92 is moved upwardly the high pressure fluid from the line 130 passes to the line 132, through a rotating chopper valve 134. The chopper valve permits flow only during a portion of each revolution so as to increase the time constant of the speed setting servo system. High pressure fluid flows through the chopper valve to the line 136 and then to the chamber 94 of the speed setting servo 96. This causes the piston 98 to move upwardly and the rod 100 to pivot clockwise about its pivot point 138 so that the roller 90 on top of the governor control valve 104 is moved downwardly. The downward movement of the roller 90 compresses the spring 102 and this force is transmitted through the sleeve 140 and through the spring 142 to the valve stem 104. Downward movement of the valve stem 104 connects the high pressure line 146 with the line 148 leading from the governor control valve. In this position of the control valve the flow of high pressure fluid is as follows: Beginning at the upper right-hand corner of Fig. 2, high pressure fluid from the pump 114 flows to the high pressure line 150 through the feathering valve 152 (to be described hereinafter) and then to the line 154, branch 146 leading to the control valve 104 and then line 148. The line 148 leads to a reversing valve 156 whose function will be described hereinafter. In the postion shown, the valve 156 will permit fluid to flow from the line 148 to the line 158 which connects with the line 118 leading to the left-hand side of the servo piston 108. This moves the cylinder 106 to the left toward a low pitch or increase r.p.m. position.

It should be noted that as the speed setting pilot valve 92 was moved upwardly so as to move the speed setting servo piston 98 upwardly, the rod 100 rotated clockwise so as to move the roller 90 at the right-hand end downwardly. This downward motion of the roller 90 is also transmitted to the rod 88 such that the point 86 is moved downwardly a proportional amount. The downward motion of the point 86 tends to neutralize the speed setting pilot valve 92 so as to prevent any further change in setting of the main control valve speeder spring 102.

As the main control servo cylinder 106 is moving to increase r.p.m. it carries with it a depending arm 162 which has integral therewith three reciprocating cams 164, 166, and 168. The operation of only cam 164 will be described at this point. In the position shown, the cam 164 as it moves to the left will cause the follower 170 to move clockwise about its pivot 172 so as to raise the roller 174 which engages the rod 176. Since the rod 176 is connected at 138 to the rod 100, the rod 100 is permitted to move upwardly about its left-hand end so as to raise the roller 90 at the right-hand end of the rod 100. This then permits the governor control valve 104 to move back toward a neutral position. This same motion of roller 90 will cause levers 88 and 84 to rotate counterclockwise about roller 82, thus raising speed set pilot valve 92. High pressure oil will be metered to the speed set servo causing lever 100 to rotate clockwise about pivot 138 and moving roller 90 back down to its original position, and, through lever 88, restoring the speed set pilot valve to its neutral position. Motion of the servo cylinder toward low pitch thus temporarily relieves the compression on speeder spring 102, providing a stabilizing effect on the control. The foregoing describes a feedback system for the governor pilot valve.

In order to decrease r.p.m., the speed setting cam 54 is rotated counterclockwise thereby moving the cam follower 74 to the left and rotating the valve crank 76 clockwise to force roller 82 downwardly along with the rod 84 and the point 86. Downward motion of the point 86 moves the stem of the speed setting pilot valve downwardly so that the line 132 is connected to drain. This drain pressure is then conducted through the chopper valve 134, line 136 to the chamber 94 of the speed setting servo 96. This moves the speed setting servo piston 98 downwardly thereby permitting the rod 100 to rotate counterclockwise about point 138 thereby raising the roller 90 on top of the governor control valve 104. This permits the flyweights to raise the control valve to connect the line 148 to drain pressure passing through the central aperture 180 and the passage 182. Drain pressure in the line 148 passes to the line 158 and thence to the line 118 leading to the left-hand side 110 of the main control servo piston 108. This in turn causes the servo cylinder 106 to move to the right toward a high pitch or decrease r.p.m. position. The feedback to the control valve through the cam 164 is the same as described above except that it operates in a reverse direction.

The throttle derivative or anticipator feature of this control is required on propeller engine combinations in which the power and speed schedules are coordinated and both controlled by one pilot operated lever. In such installations, an increase in speed setting is usually accompanied by an increase in engine power, which usually results in the blade angle having to either stay approximately constant or increase. Normally if the speed setting of a propeller is increased, the blade angle has to decrease to unload the engine and increase the speed. It is thus apparent that for most coordinated installations the control must either cancel or override the decrease pitch signal resulting from an increase in the speed setting. The anticipator cam 56 attached to the power lever sends a signal directly to the speeder spring with very little time delay. The anticipator cam motion being applied to the speeder spring is bled off through the time delay system. Thus if cam 56 rotates clockwise (speed setting cam 54 is increasing speed setting through its crank arm 76 and rod 84) so that the left end of rod 176 moves down about point 138, releasing compression on the speeder spring, the blade angle will increase. As the point 90 on top of the speeder spring moves upward, the speed setting pilot valve 92 is raised by way of rod 88 causing the speed setting servo to raise. Raising the speed setting servo 92 causes the speed setting servo element 98 to move upwardly so that rod 100 rotates clockwise about point 138 and hence wipes out the anticipation signal which had been sent to point 90 on top of the speeder spring 102.

It should be pointed out that although individual actions such as speed change, feedback and anticipation have been separately described, these actions operate more or less in cooperative unison so that stable operation is reached at the new condition of operation. In summary the following may be added.

In the present turbo-prop system the propeller and its control establish r.p.m. control of the propeller and turbine during flight conditions. However in beta control (ground handling and reversing) the propeller control schedules a blade angle and the engine fuel control controls r.p.m.

During flight conditions any change in load on the engine where there is no movement of the power or condition lever is corrected by the blades changing pitch. Underspeeds are corrected by decreasing pitch and overspeeds require increase pitch operation. The propeller control governor performs this on speed function. Speed settings during flight are controlled by the power lever. The power lever establishes a fuel flow setting for the fuel control and sends a signal to the propeller control. The first signal felt by the prop control is an anticipation signal which begins moving the blades toward the desired position corresponding to the new fuel flow setting. This anticipation signal is erased by the feedback system. The propeller receives through the time delay system a second speed setting signal to accomplish what the pilot is calling for with the new power lever setting. This second signal is in accord with the fuel flow setting and the prop and engine settle out on this new power setting.

During ground handling the propeller control is scheduling a blade angle and the fuel control is scheduling r.p.m. and fuel flow. The power lever is setting both the propeller control and fuel control. The fuel control is performing on-speed governing during the beta regime. The propeller control is providing a stop during reverse operation preventing the blade angle from going toward zero pitch. This pitch stop schedule of course is commensurate with the power setting (fuel flow) of the fuel control. The propeller control does act as a topping governor during reversing but the fuel control setting is lower than the prop setting and the prop governor is acting therefore as a safety feature.

Although the propeller such as disclosed, for example, in the above-referred-to Forman patent may include mechanical stops such as feathering and reverse stops and also disengageable low pitch stops for a positive range of operation, this control provides further pitch stops within the control itself. These stops are intended to prevent an undesirable output signal from the main control servo cylinder 106. The pitch stop system is intended to provide a stop which is variable through both the positive pitch range and the negative pitch range. Hence, the stop system is intended to prevent the propeller blades from being moved to some lower pitch than the set pitch in the positive range. In the negative range, the blades are prevented from going to some higher pitch than the desired pitch or, in other words, the blades are prevented from moving toward a less negative pitch.

The pitch stop settings are determined by the high pitch stop cam 60 and the low pitch stop cam 62 which are rotated or positioned by the power lever. The cam 60 is adapted to be engaged by a cam follower 190 while the cam 62 is adapted to be engaged by the cam follower 192. The cam follower 190 is attached to the left end of the beam 194 while the cam follower 192 is attached to the left end of the beam 196. The beams 194 and 196 are intended to pivot about cam followers 198 and 200 respectively. The cam followers 198 and 200 are fixed to piston rods 202 and 204 respectively. The piston rods 202 and 204 are actuated by pistons 206 and 208 whereby one or the other of the cam followers 198 and 200 are engageable with a cooperating cam. Thus, as shown, the cam follower 200 is in engagement with the cam 166 while the cam follower 198 is disengaged from its cooperating cam 168. The manner in which the cam followers 198 and 200 are engaged with or disengaged from their respective cooperating cams will be more clearly described in connection with the sense reversing system of this control. The beams 194 and 196 are attached at their right-hand ends to rods 214 and 216 respectively. These rods are, in turn, adjustably fixed to a rocker arm 218 which is pivoted at 220 and has its left end 222 in engagement with the bottom of the governor pilot valve stem 104. In the position shown, the low pitch stop cam 62 is operative and hence for any position of the power lever the pitch stop cam 62 will position the cam follower 192, the beam 196, beam 218 and hence will position point 222 relative to the control valve stem 104. Should then, for example, the main control servo cylinder 106 begin to move to call for a pitch which is lower than that set by the pitch stop cam 62, the motion of the servo cylinder 106 will be imparted at the same time to the cam 166. When the cam 166 moves toward the left, for example toward a lower pitch position, the cam follower 200 will be lowered whereby the beam 196 moves clockwise about its left end 192. Hence, the rod 216 will move downwardly rotating rocker 218 clockwise about its pivot 220 so that the end 222 physically moves the control valve stem 104 upwardly from its neutral position thereby calling for an increase in pitch.

In addition, when a new pitch position is set by the power lever as, for example a lower pitch, the governor pilot valve will be permitted to move downwardly to call for this lower pitch and as the main control servo cylinder moves the pitch stop system will be adjusted during the change such that when the proper blade position is reached the governor control valve stem 104 will reach a neutral position and the bottom thereof will be resting against the end 222 of the rocker 218.

During the reverse range of operation, the beam 194 has its cam follower 198 moved into engagement with the cooperating cam 168 while the cam follower 200 is disengaged from the cam 166 so that the high pitch stop cam 60 will then be setting the cam follower 190 and the high pitch limit system will be in operation. Again, it should be pointed out that the high pitch stop system prevents movement of the blades toward a less negative angle or toward the positive pitch range. Fixed mechanical pitch stops are also provided to limit the positive and negative pitch extremes of blade angle travel. Motion of the main cylinder 106 to the right, or to high pitch, is limited by the adjustable stop 276. Motion to the left, or to low pitch, is limited by the adjustable stop 274.

Fig. 2 also shows the reverse governing switchover system to provide for proper governor control in a reversing sense and also provide a variable pitch stop in the reverse range. To this end the reversing valve 156 is provided. In the position shown, the valve 156 received high pressure fluid via a line 240 which branches off the main high pressure line 154 at the bottom of the drawing. High pressure fluid to the valve flows to the line 242 but due to the valve position this high pressure fluid does not pass through the valve. However, high pressure fluid in the line 240 continues upwardly and acts on the bottom of the switchover piston 206 and the top of the switchover piston 208, thus causing the piston 206 to be in a raised position while the piston 208 is held in a down-position. The down-position of the piston 208 provides engagement of the cam follower 200 with its cooperating cam 166 providing pitch stop variation in the positive blade angle range as described above. As shown in the drawing, the top side of the piston 206 and the bottom side of the piston 208 are connected via line 246 to port 248 of the reversing valve 156 and in the valve position shown is connected to drain. In the event that reversing valve 156 is moved upwardly, the port 248 is no longer exposed to drain but instead is connected with the line 242 so that high pressure fluid passes through the port 248, the line 246 and thence to the top of piston 206 and the bottom of piston 208. Now, although both sides of these pistons are exposed to the same pressure, the top of piston 206 and the bottom of piston 208 have larger area than their respective opposing sides such that piston 206 will move downwardly and piston 208 will move upwardly. This causes pitch stop cam follower 198 to engage with its cooperating cam 168 and disengages cam follower 200 from its cooperating cam 166. Thus, is provided a quickly operable means for putting the reversing range pitch stop system (high pitch stop cam operating) into operation.

As stated above, the reversing valve, in addition, has the function of reversing the sense of the governor and governor control valve. In the position shown in Fig. 2, the reversing valve connects the line 148 leading from the governor pilot valve to the line 158 which conducts high pressure fluid to the main control servo cylinder. Thus, as the governor pilot valve stem 104 moves downwardly, high pressure fluid is connected to the line 148, while, if the valve stem moves upwardly drain pressure is connected to the line 148 through the port 182 and the passage 180. However, for controlling in the reverse range another line 254 is provided just above the line 148 leading from the governor control valve. When the reversing valve is moved upwardly the line 148 is blocked and the line 254 will then be connected to the line 158 leading to the main control servo. Under these conditions, then, the governor will act oppositely to the manner in which it had in the positive pitch range.

Thus, should the governor control valve stem 104 move upwardly the pressure line 146 will be connected to the line 254 so that high pressure fluid flows to the main control servo cylinder tending to move it toward a low pitch. In the event the control valve stem 104 moves downwardly, then the line 254 is connected to drain via the port 258 and the passage 180 running centrally of the stem. This motion will connect the main control servo cylinder with low pressure fluid thereby tending to move it toward a higher pitch or a less negative pitch.

In order to provide the above described switchover in a rapid fashion, a snap action device is provided for actuating the reverse valve 156. To this end, the valve has connected thereto a vertical rod 262 which in turn is connected to one end of a rod 264 pivoted at 266 intermediate the ends thereof. The other end of the rod 264 is operatively connected at 268 to the reverse governing switchover cam 58. This cam is driven from the shaft 52 through a tongue 270 which is centered by a pair of springs in a slot in the cam 58. A spring loaded detent 272 is also provided so that when the main power control lever is moved from the positive to the reverse range of propeller operation the tongue 270 will compress one of the springs until there is a solid drive between the tongue and the cam. At this time, the cam will be moved past the detent and there will be a positive and sudden movement of the cam as it is freed from the detent. This, in turn, will move the cam follower 268 downwardly at a sudden rate so as to rotate rod 264 and rapidly lift the rod 262 and shift the reversing valve. Hence, there is provided a no-dwell system for quickly switching over from positive pitch range operation to a negative pitch range operation for governor sense and pitch stop operation.

During feathering and unfeathering a number of control elements come into play, however, the actual feathering system will be described first. As seen in the upper left hand corner in Fig. 2, feathering valve cam 70 is rotated by the condition lever 38 of Fig. 1. The feathering valve cam 70 moves a rod 300 which in turn rotates a bell crank 302 which operates a vertical rod 304. The rod 304 moves the central portion 306 of the feathering valve 152. Motion of the rod 300 to the right raises the rod 304 in the valve element 306 such that the line 158 leading to the line 118 and to the left side of the main control servo piston 108 can be connected to drain. Thus, as the featthering valve element 306 moves upwardly, the line 158 is then connected to the line 308 which then communicates with the passage 310 in the valve element 306 whereby fluid can pass upwardly to drain via the passage 312 in the casing of the feathering valve 152. By connecting the lines 158 and 118 to drain via the line 308 the side 110 of the main servo control piston 108 is exposed to low pressure such that the cylinder 106 is moved to the right to signal the propeller to increase pitch to the feathering position.

Figures 3, 4:
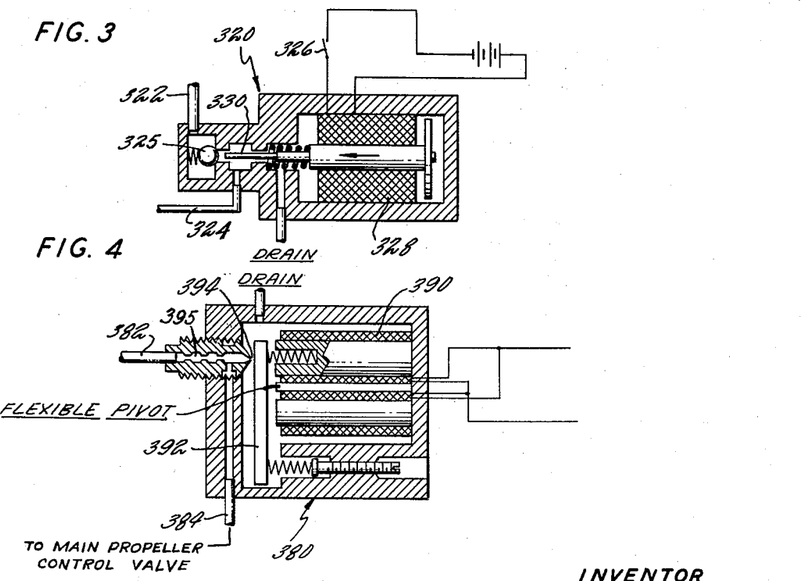
Fig. 3 is an enlarged drawing of the feathering solenoid valve.
Fig. 4 is an enlarged illustration of the synchronizer biasing valve.

The propeller may also be feathered by a feathering solenoid 320 shown schematically in the central right-hand side of Fig. 2 and also illustrated in detail in Fig. 3. The feathering solenoid 320 is connected to high pressure line 150 by means of a line 322 and is capable of connecting this line to the line 324 leading to the feathering valve 152. As seen in Fig. 3, when the switch 326 is closed the coil 328 of the solenoid valve 320 is energized so as to move the plunger 330 to the left to unseat the spring loaded ball check valve 325. This permits communication from the line 322 to the line 324. As seen in Fig. 2, the line 324 leads to an annular chamber 332 in the feathering valve. When high pressure fluid is connected to the chamber 332 the force moves the central valve element 306 upwardly against the force of the upper spring and thereby connects high pressure lines 158 and 308 to drain via the passages 310 and 312.

It will be noted that the feathering valve 152 also includes a lower moveable portion 340 which is in operative engagement with, but moveable with respect to, the central valve element 306 by means of a spring 342. Thus the element 340 will normally move with the valve element 306 and the element 340 may be physically moved upwardly to forceably move the central valve element 306 in an upward feathering position, the spring 342 being capable of transmitting sufficient force to move element 306 upward against the force of the upper spring. The lower valve element 340 can be actuated as, for example, by the member 346 connected to mechanism externally of the control. The member 346 is actuated by an engine torque sensing device such that should there be a loss of power in the power plant the control would automatically signal to feather the propeller. In order to obtain a motion of the element 346 in response to a change in power plant torque, a mechanism such as disclosed in Patent No. 2,444,363—Newcomb—may be used.

The feathering valve 152 is not actuated by the feathering valve cam 70 until the condition lever 38 of Fig. 1 has almost reached its feathering position. As the condition lever is moved toward a feathering position the unfeathering cam 68 is also rotated along with the feathering valve cam. The unfeathering cam 68 as it is moved toward the feather position engages the cam follower 69 so that the beam 196 connected thereto is raised to the extent that the cam follower 192 is lifted off the low pitch stop cam 62. The beam 196, as pointed out previously, is connected to the vertical rod 216 and, in turn, to the rocker 218 such that the main governor control valve is forced upwardly thus giving an artificial overspeed condition and thereby sending to the propeller an increase blade angle signal. Thus, the unfeathering cam is controlling blade angle up to the actual feathering position, and back down to the normal governing range when unfeathering, by varying the low pitch stop position for the main governing valve.

This provides a control which in certain installations can bring the propeller pitch back to a given blade angle when the condition lever is moved back from the feather position to some intermediate unfeather position for air starting the particular power plant.

In some propeller power plant installations it may be desirable to unfeather the propeller such that it is rotated at a given r.p.m. rather than unfeathering to a particular blade angle. To this end, the condition lever also operates a speed depressing cam 66. The speed depressing cam engages the bell crank 76 of the normal speed setting system as the condition lever is moved toward feather position. When the condition lever is rotated to the feather position, the speed depressing cam 66 rotates clockwise, this moves bell crank 76 clockwise about its pivot 78 whereby the normal speed setting cam 54 is disengaged. This motion sends an extreme decrease r.p.m. signal to the speeder spring of the main control governor pilot valve. This signal, it will be noted, is in the same direction as the signal being produced at the same time by the unfeathering cam 68 which is acting mechanically on the bottom of the main governor pilot valve. The unfeathering cam is producing, at the same time, an increasing low pitch stop setting. Both of these signals tend to raise the control valve to produce the extreme high pitch setting of the propeller blades. These signals continue changing until the condition lever position is reached when the feathering valve 152 takes over the actual feathering.

When the pilot prepares to try an air start of the power plant the condition lever is moved such that the speed depressing cam 66 is rotated counterclockwise thereby positioning the main governor speeder spring to call for a specified speed. It should be noted that, in this range, the normal speed setting cam 54 is not yet functioning. The first few degrees of movement of the condition lever returns the feathering valve 152 to its normal position so that now the speed depressing cam is signalling the desired spring setting to the speeder spring 102 of the main governor pilot valve. The propeller then will begin to unfeather and the windmilling speed will increase to the value called for by the speed depressing cam 66 and the control will maintain this desired r.p.m. After the power plant has been started the condition lever will be moved to its run position such that the normal speed setting cam 54 will take over control. It is thus possible for the pilot to control the rate of unfeathering, the engine windmilling or air start r.p.m. and the rate of engine acceleration from the air start r.p.m. to the normal governing range. The speed depressing cam calls for an r.p.m. which is lower than the lowest speed setting of the speed setting cam 54. This insures a relatively high pitch to provide a high driving torque by the airstream and avoids too high an r.p.m. until a start is obtained.

A further feature of this invention is to provide a means for automatically adjusting the main governor pilot valve setting for synchronizing two or more power plants. This synchronizing may take the form of actual speed synchronization or it may be in the form of a phase synchronization. To this end a synchronizing valve 380 is schematically shown on the right hand side of Fig. 2 and in more detail in Fig. 4. The synchronizing valve 380 receives a supply of high pressure fluid via a line 382 and controllably varies this pressure and sends this varied pressure signal via the line 384 to a land 386. The upward force resulting from this pressure acts in opposition to the force of the speeder spring and is thus capable of biasing the speed setting of the governor. Since the pressure on land 386 is controllable by the synchronizing valve 380, the speed setting of the governor can be varied over the range required for synchronizing two or more engines by the synchronizing valve. The synchronizing valve 380, seen in Fig. 4, comprises a proportional solenoid 390 of the type shown, for example, in Patent No. 2,579,723, issued December 25, 1951 to Stanley G. Best. The solenoid is intended to position a spring-biased flapper element 392 which varies the opening of an orifice 394. By varying the opening of the orifice 394, the high pressure from line 382 is adjustably varied so that the pressure of the line 384 is controlled. The series orifices 395 are intended to damp out pressure fluctuations from the pressure source and to provide a large pressure drop for a given motion of the flapper 392.

The signal being sent to the proportional solenoid coils 390 may be obtained, for example, from a device as that shown in Patent No. 2,410,659, issued to W. S. Hoover. The signal may also be obtained from a device such as is illustrated and described in connection with Fig. 6.

Figure 5:
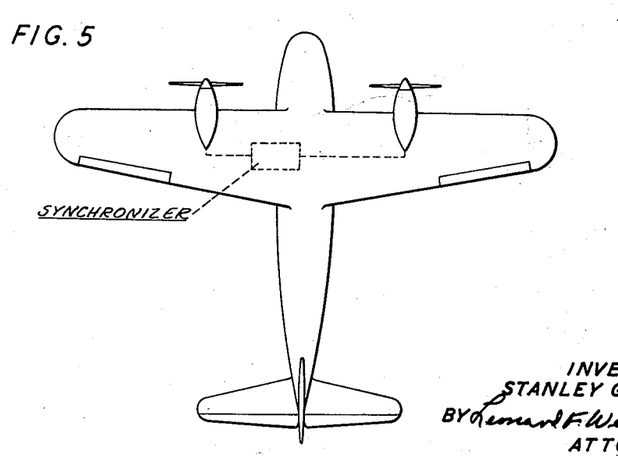
Fig. 5 is a schematic illustration of a typical multi-engine aircraft having a synchronizer device and Fig. 6 is a schematic illustration of modification of this invention.
Figure 6:
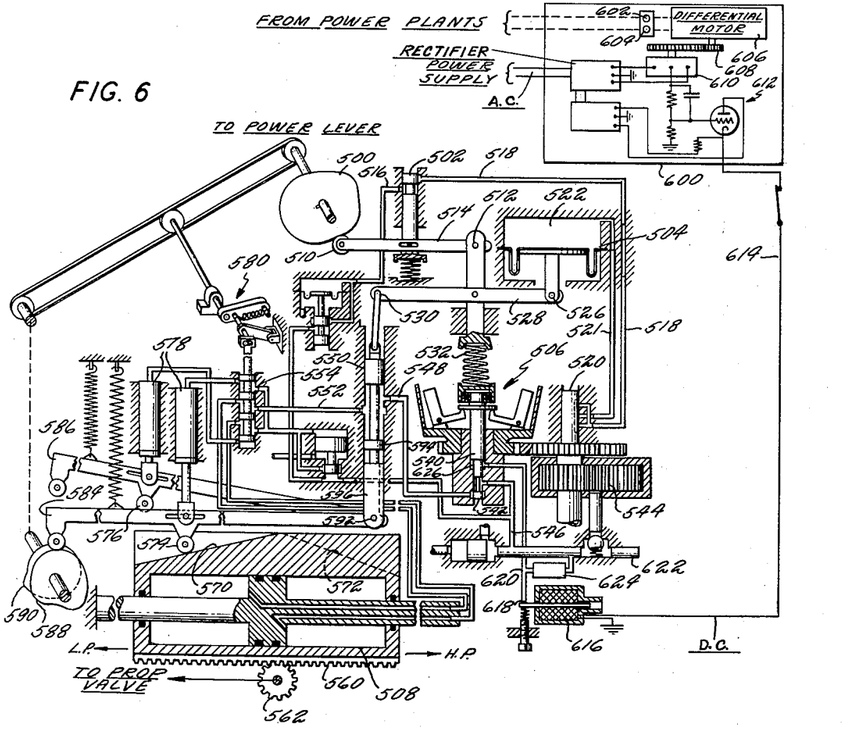

Fig. 5 illustrates a typical schematic illustration of a multi-engine aircraft having a synchronizer of a type which is more fully shown in Fig. 6. Referring to Fig. 6, a modified version of the control of this invention is illustrated. The basic principles of operation of the control shown in Fig. 6 are primarily the same as those disclosed in connection with the control shown in Fig. 2. However, rather than physically restraining the main governor pilot valve to provide a variable pitch stop, a separate pitch stop valve is used herein.

This control comprises primarily a speed setting cam 500 which operates a control valve 502 which, in turn, controls a position of a servo device 504. The servo device 504, in turn, sets the governing mechanism 506. The governing mechanism 506 controls the flow of high pressure fluid to a main servo device 508.

Thus, if an increase r.p.m. signal is desired the speed setting cam 500 will move roller 510 upwardly inasmuch as the point 512 can be considered stationary at this time. The rod 514 will rotate clockwise about the point 512 thereby lifting the servo valve 502. This connects the high pressure line 516 to the line 518 which leads first to a chopper valve 520 in order to increase the time constant of the response of the device. Line 518 is connected through the chopper valve to the line 521 which leads to the chamber 522 of the speed setting servo 504 causing the servo to move the right-hand end 526 of the rod 528 downwardly. During this motion the left-hand end 530 of the rod 528 can be considered as being stationary. Motion of the rod 528 about a point 530 compresses the speeder spring 532 to increase the r.p.m. setting of the governor. As rod 528 moves in a clockwise direction it carries along with it the point 512 on the rod 514 thereby restoring the control valve 502 to its original centered position. This stops any further change in speed setting. Conversely, if a decrease speed setting is called for, the speed setting cam 500 will be rotated such that the roller 510 moves downwardly. Here again, one can consider the point 512 of the rod 514 to be stationary. The control valve 502 is moved downwardly thus exposing the line 518 and the chamber 522 of the servo device to drain thereby moving the servo motor in an upward direction. This causes rod 528 to rotate counterclockwise thereby releasing the compression on the speeder spring 522. This decreases the r.p.m. setting of the governor and, as in the previous case, motion of the rod 528 is sent back to the control valve 502 and this valve is again centered to stop any further change in speed setting. The governing mechanism 506 includes a valve 540 which includes land 542. This land controls the flow of high pressure fluid from a gear pump 544 and line 546 to line 548 through the pitch stop valve 550, line 552 and the reversing valve 554. From the reversing valve 554, fluid is fed to the main servo 508 to actuate the rack 560 and the pinion 562 in the desired direction so as to vary the pitch of the propeller.

The speed setting servo system described above includes a time constant or time delay such that the speeder spring is not immediately changed upon a change in position of the speed setting cam. It should be noted that the speed setting cam is operatively connected to the power lever, which lever is also controlling fuel to the power plant. The introduction of a time constant in a speed setting servo system prevents undesirable thrust transients when the pilot changes his speed setting suddenly. If the speeder spring setting were to be changed as fast as the pilot's power lever could be moved, the blades would respond to the signal too abruptly resulting in sudden increases or decreases in thrust for any rapid speed setting changes. Hence during flight conditions any change in load on the engine, where there is no movement of the power or condition lever, is corrected for by the blades changing pitch. Underspeeds are corrected by decreasing pitch and overspeeds are corrected by increase pitch operation. The propeller control governor performs this on-speed function. Speed settings during flight are controlled by the power lever. The power lever establishes a fuel flow setting for the fuel control and sends a signal to the propeller control. The first signal felt by the prop control is an anticipation signal which begins moving the blades toward the desired position corresponding to the new fuel flow setting. This anticipation signal is erased by the feedback system. The propeller receives through the time delay system a second speed setting signal to accomplish what the pilot is calling for with the new power lever setting. This second signal is in accord with the fuel flow setting so that the propeller and engine settle out on this new power setting.

The time delay is accomplished by the speed setting pilot valve 92, the chopper valve 134 and the speed set servo 98. The time constant, or the period of delay, is established by judicious selection of the area of the speed set servo piston, the sizes of the fluid ports leading to and from the various elements, the system pressure and the mechanical advantage of the various links. Thus the response or output of the speed set servo system is not immediate but is delayed for a predetermined time interval.

In order to provide a feedback for the control system, a cam surface 570 is provided for the positive range while a cam surface 572 is provided for the negative range of a blade pitch. The cam surface 570 is intended to be engaged by a follower 574 while the cam surface 572 is intended to be engaged by a follower 576. The reversing valve 554 is intended to reversely actuate the cylinders 578 so as to engage one of the cam followers while disengaging the other. The reversing valve 554 includes an over-center snap action device 580 so as to avoid any dwell in the operation of the reverse mechanism.

Each of the cam followers 574 and 576 are carried by beams 584 and 586 respectively. The left-hand end of these beams are intended to engage pitch stop cams 588 and 590 respectively. The right-hand end of the beams 584 and 586 are connected at point 592 to the bottom of the pitch stop valve 550. Motion of either of the beams 584 and 586 can be transmitted through the pitch stop valve back to the beam 528 and moves to vary the pressure on the speeder spring.

By way of example, if the power lever is moved for an increase r.p.m. setting, the speed setting cam 500 will rotate and cause the speeder spring 532 to eventually be compressed in a manner such as described above. This causes the pilot valve 540 to move downwardly and causes the main servo 508 to move toward the low pitch. As the main servo moves toward low pitch, the forward blade angle cam surface 570 will cause the follower 574 and its beam 584 to rotate around the left-hand end of the beam 584. This action causes the right-hand end 592 of the beam to raise the pitch limit valve 550 and the left-hand end 530 of the beam 528. The beam 528 is thus moved clockwise about its right-hand end 526 thereby releasing some of the compressive force on the speeder spring 532. Therefore, it is apparent that the signal expressed by the feedback system is in opposition to the increase r.p.m setting set to the control by the power lever and the speed setting cam 500.

In addition, as the rod 528 is rotated about its right-hand end 526, this will raise the point 512 and rod 514 thereby lifting the control valve 502. This connects high pressure oil to the chamber 522 of the speed setting servo 504 causing it to move downwardly. This downward motion causes the rod 528 to rotate clockwise around its left end 530 thereby recentering the control valve 502 and also reapplying the speeder spring compression removed in the manner described above. This feedback signal exerts a stabilizing influence on the governor and by its temporary nature eliminates the droop error (speed setting affected by blade angle) normally associated with feedback of this type. Thus, in reality, a temporary droop is obtained.

In the reverse range of operation, the beam 586 has its cam follower 576 engaging the cam surface 572 and the controlling forces merely operated in a reverse fashion. The pitch stop valve 550 rather than physically restraining the main governor control valve acts so as to vary the pressure being sent from the main governor control valve land 542 through to the main servo cylinder 508. Thus, when the pitch stop valve 550 moves up sufficiently high its land 594 will tend to close off the port leading to the line 552. Thus, no further pitch change is permitted. In the event that the main servo 508 continues to move calling for a pitch change, a land 594 will move up slightly thereby reducing the pressure in line 552. This is done by bleeding off the fluid under pressure from line 552 to drain via an elongated slot 596. This will permit correction of the proper blade angle to the required limit.

A synchronizer 600 is schematically illustrated in the upper right-hand corner of Fig. 6. As shown schematically, signal generators 602 and 604 provide a voltage proportional to the speed of each of the power plants. Only two generators are shown herein but it is apparent that more generators could be used. The signal from these generators are then compared by a differential motor 606 which, in turn, will rotate in one of two directions. Rotation of the differential motor rotates gears 608 which move a potentiometer 610.

The signal from the potentiometer 610 passes through a compensating network 612 to enhance stability and passes the signal on via the line 614 to a proportional solenoid 616. The proportional solenoid 616 varies the area of an orifice 618 which is discharging to drain. Fluid under pressure is fed to the orifice 618 and line 620 from the main high-pressure manifold 622 via a series of fixed orifices 624. The line 620 leads to a chamber 626 whereby the pressure in the chamber biases the valve 540 in opposition to the force of the speeder spring 532. By varying the area of this orifice 618, the pressure in the chamber 626 can be varied so as to cause a variation in position of the valve 540 in order to correct blade pitch until both power plants are synchronized in speed.

Although several embodiments of this invention have been illustrated and described herein, it will be apparent that various changes and modifications may be made in the construction and arrangement of the various parts without departing from the scope of this novel concept.

What it is desired by Letters Patent is:

1. In a propeller having variable pitch blades, means for varying the pitch of said blades including a servo motor, means for controlling said pitch varying means including a control valve operatively connected to said servo motor, means for moving said control valve including a governor and speed setting means, means for resetting said speed setting means including a feedback connection between said servo motor and said control valve, means for temporarily resetting said speed setting means including operative connections to said speed setting means, and fluid pressure means for biasing said control valve in opposition to said speed setting means.

2. In a propeller having variable pitch blades, means for varying the pitch of said blades including a servo motor, means for controlling said pitch varying means including a control valve operatively connected to said servo motor, means for moving said control valve including a governor and speed setting means, means for resetting said speed setting means including a feedback connection between said servo motor and said control valve, means for temporarily resetting said speed setting means including operative connections to said speed setting means, and valve means in said feedback connection controlling hydraulic means to bias the control valve for varying the effect of said control valve on said servo motor.

3. In a propeller having variable pitch blades, means for varying the pitch of said blades including a servo motor, means for controlling said pitch varying means including a control valve operatively connected to said servo motor, means for moving said control valve including a governor and speed setting means, means for resetting said speed setting means including a feedback connection between said servo motor and said control valve, means for temporarily resetting said speed setting means including operative connections thereto, and means including valve means in said feedback connection forming a stop for controlling said servo motor.

4. In a propeller having variable pitch blades, means for varying the pitch of said blades including a servo motor, means for controlling said pitch varying means including a control valve operatively connected to said servo motor, means for moving said control valve including a governor and speed setting means, means for resetting said speed setting means including a feedback connection between said servo motor and said control valve, means for temporarily resetting said speed setting means including operative connections thereto, fluid pressure means for biasing said control valve in opposition to said speed setting means, and pitch limit means for effecting said control valve to override said speed setting means.

5. In a propeller having variable pitch blades, means for varying the pitch of said blades including a servo motor, means for controlling said pitch varying means including a control valve operatively connected to said servo motor, means for moving said control valve including a governor and speed setting means, means for resetting said speed setting means including a feed-back connection between said servo motor and said control valve, and means for temporarily resetting said speed setting means including operative connections thereto, fluid pressure means for biasing said control valve in opposition to said speed setting means, and pitch limit means operatively connected to said control valve for modifying the effect thereof.

6. In a propeller-turbine power plant combination, the propeller including variable pitch blades, means for regulating the power output of the power plant including a manual control, means for varying the pitch of said blades, means for controlling said pitch varying means including a control valve, speed governing means for operating said control valve including a speeder spring, means for varying the setting of said spring, means responsive to movement of said manual control for temporarily resetting said speeder spring, and feedback means connecting said blades to said spring and responsive to blade pitch change for returning said spring to its original setting, said last-mentioned means including time delay mechanism.

7. In a speed controlling system for an operating device, a governor having a speeder spring, means for varying the force exerted by said speeder spring to vary the speed setting of said governor, a control valve controlled by said governor for controlling a device whose speed is being governed, a fluid chamber cooperating with said control valve whereby a bias is exerted on said valve, a passage leading to said chamber, means for supplying fluid under pressure to said passage, means for bleeding fluid from said passage to vary the pressure therein, and means responsive to a parameter of operation of the device for controlling said bleeding means including a valve and a proportional solenoid for operating said valve.

8. A speed controlling system according to claim 7 including a series of fixed orifices connected with said last mentioned valve.

9. In an aircraft having a plurality of power plants, propellers driven by said power plants, each of said propellers having variable pitch blades, means for varying the pitch of the blades for each of said propellers, a governor for at least one of said propellers including a speeder spring and a control valve, said control valve being connected to said means for varying the pitch of said one propeller, a fluid chamber cooperating with said control valve whereby a bias is exerted on said valve, means for varying the pressure in said chamber to urge said control valve in a direction opposing said speeder spring, and means responsive to a difference in operation of said one propeller and another of said propellers for regulating said pressure varying means.

10. In a propeller having variable pitch blades, means for varying the pitch of said blades including a servo motor, means for controlling said pitch varying means including a control valve operatively connected to said servo motor, a speeder spring biasing said control valve, means for adjusting the pressure on said speeder spring to set the speed of the propeller including operative connections thereto, feedback means from said servo motor to said controlling means, and propeller pitch anticipator means connected to said speeder spring and said adjusting means for temporarily affecting adjustment of the pressure on said speeder spring, said feedback means modifying the adjustment of said spring by said anticipator means.

11. In a propeller having variable pitch blades, means for varying the pitch of said blades including a servo motor, means for controlling said pitch varying means including a control valve operatively connected to said servo motor, a speeder spring biasing said control valve, means for adjusting the pressure on said speeder spring to set the speed of the propeller including a servo system operatively connected thereto, feedback means from said servo motor to said controlling means, and propeller blade pitch anticipator means connected to said speeder spring adjusting means and said servo motor for also adjusting the pressure on said speeder spring, the adjustment by said anticipator means being wiped out by movement of said servo motor.

12. In a propeller having variable pitch blades, means for varying the pitch of said blades including a servo motor, means for controlling said pitch varying means including a control valve operatively connected to said servo motor, a speeder spring biasing said control valve, means for adjusting the pressure on said speeder spring to set the speed of the propeller, feedback means from said servo motor to said controlling means, propeller pitch anticipator means connected to said spring and said adjusting means for also adjusting the pressure on said speeder spring, hydraulic means for moving said control valve independently of said speeder spring.

13. In a propeller having variable pitch blades, means for varying the pitch of said blades including a main servo motor, means for controlling said pitch varying means including a control valve, means for moving said control valve including a governor and speed setting means, a speed setting servo mechanism for setting said setting means, a feedback connection between said main servo and said control valve, means for temporarily resetting said speed setting means including operative connections to said feedback connection, and pitch limit means for varying the effect of said control valve on said main servo including an operative connection to said control valve and the servo motor.

14. A propeller having variable pitch blades, means for varying the pitch of said plades including a servo motor, means for controlling said pitch varying means including a control valve operatively connected to said servo motor, means for moving said control valve including a governor and speed setting means, means for resetting said speed setting means including a feedback connection between said servo motor and said control valve, means for temporarily resetting said speed setting means including operative connections to said feedback connection, fluid pressure means for biasing said control valve in opposition to said speed setting means, a second propeller unit, means for sensing a difference of value of a variable of operation of said two propellers for controlling said fluid pressure means.

15. In a propeller having variable pitch blades, a main servo motor for varying the pitch of said blades, means for controlling said main servo motor including a main control valve operatively connected to said servo motor, a governor including a speeder spring for moving said main control valve, a feedback mechanism for resetting said speeder spring upon movement of said servo motor, a manually operated control, a speed setting control valve and a speed setting servo controlled by said control, said speed setting servo having a time delay, anticipator means for directly and temporarily resetting said speeder spring upon operation of said manually operated control, and means operatively connecting said feedback mechanism and said anticipator means with said speed setting control valve and said speed setting servo whereby said speed setting servo wipes out the temporary resettings of said feedback mechanism and said anticipator means.

16. A propeller according to claim 15 including hydraulic means for biasing said main control valve in opposition to said speeder spring.

17. In a speed controlling system, a governor having a speeder spring, means for varying the force exerted by said speeder spring to vary the speed setting of said governor, a control valve controlled by said governor for controlling a device whose speed is being governed, a fluid chamber cooperating with said control valve whereby a fluid pressure bias is exerted on said control valve acting against said speeder spring, a passage leading to said chamber, means for supplying fluid under pressure to said passage, means for bleeding fluid from said passage to vary the pressure therein, and thereby varying said bias means producing a regulating signal, means responsive to said signal for controlling said bleeding means including a valve movable thereby.

References Cited in the file of this patent

UNITED STATES PATENTS

| | | |
|---|---|---|
| 2,423,191 | Kopp | July 1, 1947 |
| 2,613,750 | Breguet et al. | Oct. 14, 1952 |
| 2,679,297 | Eastman et al. | May 25, 1954 |
| 2,738,022 | Zwack | Mar. 13, 1956 |

UNITED STATES PATENT OFFICE

CERTIFICATE OF CORRECTION

Patent No. 2,923,361                      February 2, 1960

Stanley G. Best

It is hereby certified that error appears in the printed specification of the above numbered patent requiring correction and that the said Letters Patent should read as corrected below.

Column 14, line 43, for "plades" read -- blades --; column 16, line 1, after "bias" insert a comma.

Signed and sealed this 19th day of July 1960.

(SEAL)
Attest:
KARL H. AXLINE                         ROBERT C. WATSON
Attesting Officer                       Commissioner of Patents